(12) United States Patent
Kim et al.

(10) Patent No.: US 9,493,909 B2
(45) Date of Patent: Nov. 15, 2016

(54) FIBER-CONTAINING COMPOSITES

(71) Applicant: Liquidmetal Coatings LLC, Humble, TX (US)

(72) Inventors: Choongnyun P. Kim, Northridge, CA (US); John Kang, Kingwood, TX (US)

(73) Assignee: LIQUIDMETAL COATINGS, LLC, Lake Forest, CA (US)

( * ) Notice: Subject to any disclaimer, the term of this patent is extended or adjusted under 35 U.S.C. 154(b) by 671 days.

(21) Appl. No.: 13/827,354

(22) Filed: Mar. 14, 2013

(65) Prior Publication Data

US 2014/0030948 A1   Jan. 30, 2014

Related U.S. Application Data

(60) Provisional application No. 61/675,084, filed on Jul. 24, 2012.

(51) Int. Cl.
| | | |
|---|---|---|
| *C22C 47/00* | (2006.01) | |
| *D03D 15/00* | (2006.01) | |
| *D06M 23/00* | (2006.01) | |
| *C22C 47/08* | (2006.01) | |
| *C22C 49/02* | (2006.01) | |
| *B29C 70/88* | (2006.01) | |

(52) U.S. Cl.
CPC ............ *D06M 23/00* (2013.01); *B29C 70/885* (2013.01); *C22C 47/08* (2013.01); *C22C 49/02* (2013.01); *C22C 2200/02* (2013.01); *Y10T 428/249957* (2015.04); *Y10T 428/31678* (2015.04); *Y10T 442/339* (2015.04)

(58) Field of Classification Search
CPC ... C22C 47/08; C22C 2200/02; C22C 47/14; D03D 15/00
USPC ................ 427/331, 372.2; 428/307.3, 307.7; 442/229
See application file for complete search history.

(56) References Cited

U.S. PATENT DOCUMENTS

| | | | | |
|---|---|---|---|---|
| 3,095,642 | A * | 7/1963 | Lockwood | C22C 47/062 29/419.1 |
| 4,606,608 | A * | 8/1986 | Wysocki | C03C 25/108 385/128 |
| 4,754,974 | A * | 7/1988 | Kobayashi | A63B 53/04 473/327 |
| 4,754,975 | A * | 7/1988 | Aizawa | A63B 53/04 473/348 |
| 5,567,251 | A * | 10/1996 | Peker | B22D 19/14 148/522 |
| 6,771,490 | B2 * | 8/2004 | Peker | C22C 33/003 148/403 |
| 2002/0182961 | A1 * | 12/2002 | Clercq | B29C 70/22 442/316 |
| 2003/0024616 | A1 * | 2/2003 | Kim | C22C 45/10 148/561 |
| 2003/0222122 | A1 * | 12/2003 | Johnson | B22D 11/001 228/101 |
| 2004/0267349 | A1 * | 12/2004 | Richter | A61L 17/145 623/1.13 |
| 2005/0084407 | A1 * | 4/2005 | Myrick | B22F 1/0003 419/66 |
| 2006/0062684 | A1 * | 3/2006 | Zahrah | B22F 1/0003 419/66 |
| 2006/0130943 | A1 * | 6/2006 | Peker | C22C 29/005 148/561 |
| 2008/0125848 | A1 * | 5/2008 | Kusleika | A61L 29/02 623/1.11 |
| 2011/0086566 | A1 * | 4/2011 | Goering | B29B 11/16 442/204 |
| 2014/0348571 | A1 * | 11/2014 | Prest | B21J 5/04 403/52 |

* cited by examiner

*Primary Examiner* — Cachet Sellman
(74) *Attorney, Agent, or Firm* — Pilsbury Winthrop Shaw Pittman LLP (57) ABSTRACT

Provided in one embodiment is a method for producing a composition, comprising: heating a first material comprising an amorphous alloy to a first temperature; and contacting the first material with a second material comprising at least one fiber to form a composition comprising the first material and the second material; wherein the first temperature is higher than or equal to a glass transition temperature ($T_g$) of the amorphous alloy.

16 Claims, 4 Drawing Sheets

FIBER-CONTAINING COMPOSITES

RELATED APPLICATION

This application claims priority to U.S. Provisional Application Ser. No. 61/675,084, filed Jul. 24, 2012, which is hereby incorporated by reference in its entirety.

BACKGROUND

Fiber containing composites offer many advantages that have led to wide spread use in a variety of applications. Conventional fiber containing composites contain fibers and a resin matrix material. These fiber-resin composites offer many advantages, such as a highly desirable strength to weight ratio. Despite the many beneficial properties of fiber-resin composites, these resin-containing composites do not offer the corrosion resistance and wear resistance desired for many applications.

Conventional fiber-resin composites have been employed as parts of aerospace components, automobiles, boats, ships, medical devices, sporting equipment, industrial equipment and electronic devices. While the strength to weight ratio exhibited by conventional composites offers many advantages in these applications, the unsatisfactory wear and corrosion resistance of the conventional composites often need costly inspection schedules and have short service lifetimes.

Accordingly, there exists a need for fiber containing composite materials that provide improved properties, such as corrosion and wear resistance.

SUMMARY

Provided in some embodiments is a fiber-containing alloy composite composition, a method of making the composite composition, and a method of using the method composite composition to improve the properties of the material. The fiber-containing alloy composition provides improved properties in comparison to conventional materials comprising a fiber.

One embodiment provides a method for producing a composition, the method comprising: contacting a first material comprising an amorphous alloy at a first temperature with a second material comprising at least one fiber to form a composition comprising the first material and the second material, wherein the first temperature is higher than or equal to the $T_g$ of the amorphous alloy.

Another embodiment provides a composition, the composition comprising a first material disposed over a second material, wherein at least a portion of the first material is in contact with the second material, the first material comprises a first amorphous alloy, and the second material comprises at least one fiber.

Another embodiment provides a composition, the composition comprising a woven material comprising at least one first fiber comprising a first material and at least one second fiber comprising a second material, wherein the first material comprises an amorphous alloy, and the second material comprises the element carbon, boron, silicon, oxygen, or combinations thereof.

Another embodiment provides a method of producing a composition, the method comprising: weaving together at least one first fiber comprising a first material and at least one second fiber comprising a second material to form a woven material, wherein the first material comprises an amorphous alloy, and the second material comprises the element carbon, boron, silicon, oxygen, or combinations thereof.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 2(a)-2(b) are schematic drawings of a composition according to at least one exemplary embodiment, wherein a single layer of a first material and a single layer of a second material are present.

FIGS. 3(a)-3(b) are schematic drawings of a composition according to at least one exemplary embodiment, wherein multiple layers of a first material and multiple layers of a second material are present.

DETAILED DESCRIPTION

One embodiment is related to a method for producing a composition comprising a first material and a second material, wherein the first material comprises a first amorphous alloy and the second material comprises at least one fiber. Another embodiment is related to a composition comprising a first material disposed over a second material, wherein at least a portion of the first material is in contact with the second material, the first material comprises a first amorphous alloy, and the second material comprises at least one fiber. Another embodiment is related to a method for improving a property of a composition which comprises at least one fiber and is substantially free of amorphous alloy.

Amorphous Alloys

An alloy may refer to a mixture, including a solid solution, of two or more metal elements—e.g., at least 2, 3, 4, 5, or more elements. The term "element" herein may refer to the element that may be found in a Periodic Table. A metal may refer to any of alkali metals, alkaline earth metals, transition metals, post-transition metals, lanthanides, and actinides.

An amorphous alloy may refer to an alloy having an amorphous, non-crystalline atomic or microstructure. The amorphous structure may refer to a glassy structure with no observable long range order; in some instances, an amorphous structure may exhibit some short range order. Thus, an amorphous alloy may sometimes be referred to as a "metallic glass." An amorphous alloy may refer to an alloy of which at least about 50% is an amorphous phase—e.g., at least about 60%, about 70%, about 80%, about 90%, about 95%, about 99% or more. The percentage herein may refer to volume percent or weight percent, depending on the context. The term "phase" herein may refer to a physically distinctive form of a substance, such as microstructure. For example, a solid and a liquid are different phases. Similarly, an amorphous phase is different from a crystalline phase.

Amorphous alloys may contain a variety of metal elements. In some embodiments, the amorphous alloys may comprise zirconium, titanium, iron, copper, nickel, gold, platinum, palladium, aluminum, or combinations thereof. In some embodiments, the amorphous alloys may be zirconium-based, titanium-based, iron-based, copper-based, nickel-based, gold-based, platinum-based, palladium-based, or aluminum-based. The term "M-based" when referred to an alloy may refer to an alloy comprising at least about 30% of the M element—e.g., about 40%, about 50%, about 60%, about 70%, about 80%, about 90%, about 95%, or more. The percentage herein may refer to volume percent or weight percent, depending on the context.

An amorphous alloy may be a bulk solidifying amorphous alloy. A bulk solidifying amorphous alloy, or bulk metallic glass ("BMG") or bulk amorphous alloy, may refer to an amorphous alloy that has at least one dimension in the millimeter range. In one embodiment, this dimension may refer to the smallest dimension. Depending on the geometry, the dimension may refer to thickness, height, length, width, radius, and the like. In some embodiments, this smallest dimension may be at least about 0.5 mm—e.g., at least about 0.8 mm, about 1 mm, about 2 mm, about 3 mm, about 4 mm, about 5 mm, about 6 mm, about 8 mm, about 10 mm, about 12 mm, or more. The magnitude of the largest dimension is not limited and may be in the millimeter range, centimeter range, or even meter range.

An amorphous alloy, including a bulk amorphous alloy, described herein may have a critical cooling rate of about 500 K/sec or less. The term "critical cooling rate" herein may refer to the cooling rate below which an amorphous structure is not energetically favorable and thus is not likely to form during a fabrication process. In some embodiments, the critical cooling rate of the amorphous alloy may be, for example, about 400 K/sec or less—e.g., about 300 K/sec or less, about 250 K/sec or less, about 200 K/sec or less.

The amorphous alloy may have a variety of chemical compositions. In one embodiment, the amorphous alloy is a Zr-based alloy, such as a Zr—Ti based alloy, such as $(Zr, Ti)_a(Ni, Cu, Fe)_b(Be, Al, Si, B)_c$, where each of a, b, c, is independently a number representing atomic % and a is in the range of from 30 to 75, b is in the range of from 5 to 60, and c in the range of from 0 to 50. Other incidental, inevitable minute amounts of impurities may also be present. In some embodiments, these alloys may accommodate substantial amounts of other transition metals, such as Nb, Cr, V, Co. A "substantial amount" in one embodiment may refer to about 5 atm % or more—e.g., 10 atm %, 20 atm %, 30 atm %, or more.

In one embodiment, an amorphous alloy herein may have the chemical formula $(Zr, Ti)_a(Ni, Cu)_b(Be)_c$, where each of a, b, c, is independently a number representing atomic % and a is in the range of from 40 to 75, b is in the range of from 5 to 50, and c in the range of from 5 to 50. Other incidental, inevitable minute amounts of impurities may also be present. In another embodiment, the alloy may have a composition $(Zr, Ti)_a(Ni, Cu)_b(Be)_c$, where each of a, b, c, is independently a number representing atomic % and a is in the range of from 45 to 65, b is in the range of from 7.5 to 35, and c is in the range of from 10 to 37.5 in atomic percentages.

In another embodiment, the amorphous alloy may have the chemical formula $(Zr)_a(Nb, Ti)_b(Ni, Cu)_c(Al)_d$, where each of a, b, c, d is independently a number representing atomic % and a is in the range of from 45 to 65, b is in the range of from 0 to 10, c is in the range of from 20 to 40, and d is in the range of from 7.5 to 15. Other incidental, inevitable minute amounts of impurities may also be present.

In some embodiments, the amorphous alloy may be a ferrous-metal based alloy, such as a (Fe, Ni, Co) based compositions. Examples of such compositions are disclosed in U.S. Pat. No. 6,325,868 and in publications (A. Inoue et. al., Appl. Phys. Lett., Volume 71, p 464 (1997)), (Shen et. al., Mater. Trans., JIM, Volume 42, p 2136 (2001)), and Japanese patent application 2000126277 (Publ. #2001/303218 A). For example, the alloy may be $Fe_{72}A_{15}Ga_2P_{11}C_6B_4$, or $Fe_{72}A_{17}Zr_{10}Mo_5W_2B_{15}$.

Amorphous alloys, including bulk solidifying amorphous alloys, may have high strength and high hardness. The strength may refer to tensile or compressive strength, depending on the context. For example, Zr and Ti-based amorphous alloys may have tensile yield strengths of about 250 ksi or higher, hardness values of about 450 Vickers or higher, or both. In some embodiments, the tensile yield strength may be about 300 ksi or higher—e.g., at least about 400 ksi, about 500 ksi, about 600 ksi, about 800 ksi, or higher. In some embodiments, the hardness value may be at least about 500 Vickers—e.g., at least about 550, about 600, about 700, about 800, about 900 Vickers, or higher.

In one embodiment, ferrous metal based amorphous alloys, including the ferrous metal based bulk solidifying amorphous alloys, can have tensile yield strengths of about 500 ksi or higher and hardness values of about 1000 Vickers or higher. In some embodiments, the tensile yield strength may be about 550 ksi or higher—e.g., at least about 600 ksi, about 700 ksi, about 800 ksi, about 900 ksi, or higher. In some embodiments, the hardness value may be at least about 1000 Vickers—e.g., at least about 1100 Vickers, about 1200 Vickers, about 1400 Vickers, about 1500 Vickers, about 1600 Vickers, or higher.

As such, any of the aforedescribed amorphous alloys may have a desirable strength-to-weight ratio. Furthermore, amorphous alloys, particularly the Zr- or Ti-based alloys, may exhibit good corrosion resistance and environmental durability. The corrosion herein may refer to chemical corrosion, stress corrosion, or a combination thereof.

The amorphous alloys, including bulk amorphous alloys, described herein may have a high elastic strain limit of at least about 0.5%, including at least about 1%, about 1.2%, about 1.5%, about 1.6%, about 1.8%, about 2%, or more—this value is much higher than any other metal alloy known to date.

In some embodiments, the amorphous alloys, including bulk amorphous alloys, may additionally include some crystalline materials, such as crystalline alloys. The crystalline material may have the same or different chemistry from the amorphous alloy. For example, in the case wherein the crystalline alloy and the amorphous alloy have the same chemical composition, they may differ from each other only with respect to the microstructure.

In some embodiments, crystalline precipitates in amorphous alloys may have an undesirable effect on the properties of amorphous alloys, especially on the toughness and strength of these alloys, and as such it is generally preferred to minimize the volume fraction of these precipitates. However, there may be cases in which ductile crystalline phases precipitate in-situ during the processing of amorphous alloys, which may be beneficial to the properties of amorphous alloys, especially to the toughness and ductility of the alloys. One exemplary case is disclosed in C. C. Hays et. al, Physical Review Letters, Vol. 84, p 2901, 2000. In at least one embodiment herein, the crystalline precipitates may comprises a metal or an alloy, wherein the alloy may have a composition that is the same as the composition of the amorphous alloy or a composition that is different from the composition of the amorphous alloy. Such amorphous alloys comprising these beneficial crystalline precipitates may be employed in at least one embodiment described herein.

Fiber Material

The term "fiber" described herein may refer to any material having a cylindrical or tubular shape. The fiber may have any suitable length, ranging from nanometer to micrometer to millimeter to centimeter or larger. The fiber may have any diameter, depending on the application, the diameter ranging from nanometer to micrometer to millimeter to centimeter or larger. In one embodiment, the fiber may have a diameter of at least about 1 nm—e.g., at least about 5 nm, about 10 nm, about 50 nm, about 100 nm, about 500 nm, about 1 micron, about 5 microns, about 10 microns, about 50 microns, about 100 microns, about 500 microns, about 1 mm, or more. For example, the fiber may have a diameter in the range of about 1 nm to about 1 mm—e.g., about 5 nm to about 500 microns, about 10 nm to about 100 microns, about 50 nm to about 100 microns, about 100 nm to about 50 microns, about 500 nm to about 10 microns, about 1 micron to about 5 microns, about 5 microns to about 10 microns, etc.

The fiber-containing material may have different shapes. For example, the material may be a weave, bundle, mat, or individual strand of a plurality of the aforedescribed above. In one embodiment, the fibers may be present as a bundle or multiple bundles, each bundle comprising multiple fibers. Depending on the size and/or number of the fibers contained therein, a fiber bundle may have various sizes. For example, a fiber bundle may have a diameter of at least about 10 nm—e.g., at least about 50 nm, about 100 nm, about 500 nm, about 1 micron, about 5 microns, about 10 microns, about 50 microns, about 100 microns, about 500 microns, about 1 mm, about 2 mm, about 5 mm, or more. For example, the fiber bundle may have a diameter in the range of about 10 nm to about 10 mm—e.g., about 50 nm to about 5 mm, about 100 nm to about 2 mm, about 500 nm to about 1 mm, about 1 micron to about 500 microns, about 50 microns to about 100 microns, etc.

The fiber materials described herein may comprise any suitable material. For example, the fiber may comprise the element carbon, boron, silicon, oxygen, or combinations thereof. In some embodiments, the fiber may comprise silicon carbide, glass, boron, carbon, or any combinations thereof. The glass may comprise an oxide, such as a metal oxide or a non-metal oxide. In one embodiment, the oxide comprises a silicon oxide.

In one embodiment, the fibers comprise carbon fibers. The fibers herein may be carbon-containing fibers. In one embodiment, the carbon-containing fiber is a carbon fiber formed from filaments that substantially comprise carbon atoms. In at least one embodiment, the carbon fibers may have a turbostratic or graphitic structure. In other embodiments, the carbon may have an amorphous structure. The carbon fibers may be single crystalline or polycrystalline, depending on the application. The carbon fibers may have any of the aforedescribed diameters of a fiber described herein.

In one embodiment, the fibers are part of a woven (fabric) sheet. In another embodiment the fibers are part of a mat or bundle. The woven fabric sheet, mat and bundles may contain pores. The pores may refer to empty spaces within the confines of the structure that are not filled by the individual fibers.

In some embodiments, the fibers are present as individual strands. These strands may have diameters of at least about 1 nm—e.g., at least about 5 nm, about 10 nm, about 50 nm, about 100 nm, about 500 nm, about 1 micron, about 5 microns, about 10 microns, about 50 microns, about 100 microns, about 500 microns, about 1 mm, or more. In at least one embodiment, the strands have a diameter in the range of about 1 nm to about 1 mm—e.g., about 5 nm to about 500 microns, about 10 nm to about 100 microns, about 50 nm to about 100 microns, about 100 nm to about 50 microns, about 500 nm to about 10 microns, about 1 micron to about 5 microns, or about 5 to about 10 microns. The length of the strands is not limited and may be in the millimeter range, centimeter range or even meter range.

In one embodiment, the fiber may comprise a glass fiber that comprises an oxide glass, silicate glass, borosilicate glass, phosphate glass, phosphosilicate glass, aluminophosphate glass, borophosphate glass, aluminosilicate glass, aluminoborosilicate glass, alkali-lime glass, alumino-lime silicate glass, or any combinations thereof.

In another embodiment, the fiber may comprise a silicon carbide fiber. In at least one embodiment, the fiber may be a boron fiber. Other types of materials are also possible.

The fiber or fibers may be a part of a composite material that includes a polymer resin. The polymer resin may form a matrix in at least one embodiment and the fibers may be dispersed within the matrix.

Fiber-Containing Composite

The compositions described herein may be fiber-containing composites. One embodiment provides a first material disposed over a second material, wherein at least a portion of the first material is in contact with the second material, the first material comprises an amorphous alloy, and the second material comprises at least one fiber.

The first material may comprise any of the amorphous alloys described herein. In an exemplary embodiment, the first material consists essentially of an amorphous alloy. In another embodiment, the first material consists of an amorphous alloy. In at least one embodiment, the first material comprises a bulk amorphous alloy. In another embodiment, the amorphous alloy of the first material is not a bulk amorphous alloy.

The first material may further comprise a crystalline material. The crystalline material may be a crystalline alloy having the same or different chemical composition from the amorphous alloy. The crystalline material may have a melting temperature below the degradation temperature of the fiber contained in the second material. The degradation temperature of a material herein may refer to a temperature when the material starts to exhibit changes in at least one property. For example, the degradation may be a melting temperature, glass transition temperature, crystallization, or others, depending on the context and the material. In another embodiment, degradation may refer to a temperature at which the material begins to interact chemically with another material (e.g., chemical reaction).

In at least one embodiment, the crystalline material comprises crystal (or "grain") sizes in the nanometer range, micron range, millimeter range, centimeter range, or any combinations thereof. For example, the first material may comprise a nano-crystalline material. The crystalline material may comprise an alloy of the same composition as the amorphous alloy in the first material, an alloy different from the amorphous alloy in the first material, a metal, a nonmetal, or any combinations thereof.

The second material may comprise any of the fiber materials described herein. In an exemplary embodiment, the second material comprises at least one amorphous alloy fiber. In at least one embodiment, the second material comprises a woven material comprising at least one first fiber comprising a first material and at least one second fiber comprising a second material. The first material may comprise an amorphous alloy and the second material may comprise fiber (e.g., carbon fiber, or any of the fibers aforedescribed). In at least one embodiment the second material comprises a polymer resin and at least one fiber. The second material may be a polymer resin-carbon fiber composite that comprises a polymer resin and at least one carbon fiber.

The first amorphous alloy containing material may be mechanically bonded to the second fiber-containing material. A mechanical bond herein may refer to a physical bond that is different from a chemical bond. For example, a mechanical bond may be a result of physical interlocking. In at least one embodiment, the mechanical bond is formed by the first material at least partially infiltrating at least a portion (e.g., pores) of the second material. In one embodiment where the second material has pores, at least some of the pores are infiltrated. For example, the pores may be completely infiltrated.

Depending on the size of the pores and the relative volume or mass percentages of the first and second materials, the composite composition may also resemble a composite in which a plurality of fibers are contained in a matrix that comprises an amorphous alloy. The fibers may be any of the aforementioned fiber materials, and the amorphous alloy may be any of the aforedescribed amorphous alloys. For example, in one embodiment, the fibers may be contained within a matrix comprising an amorphous alloy—this may be the case wherein the composite contains more amorphous alloy containing material than the fiber containing material. In another embodiment, the amorphous alloy containing material may be contained within a fibrous network/matrix and/or within the interstitial spaces between the fiber weaves (e.g., amorphous alloy in a basket configuration woven with the fiber material and/or in the interstitial spaces of the fiber weaves)—this may be the case wherein the composite contains more fiber containing material than amorphous alloy containing material.

The thickness of this infiltration zone may be equal to or greater than about 1 micron—e.g., equal to or greater than about 2 microns, about 5 microns, about 10 microns, about 15 microns, about 20 microns, about 50 microns, about 100 microns, or more. In other words, the first material may infiltrate from the surface to the interior of the second material to a depth equal to or greater than about 1 micron—e.g., equal to or greater than about 2 microns, about 5 microns, about 10 microns, about 15 microns, about 20 microns, about 50 microns, about 100 microns, or more. The infiltration zone, or infiltration depth, may be in one embodiment in the range of about 1 micron to about 5 cm—e.g., about 2 microns to about 2 cm, about 5 microns to about 1 cm, about 10 microns to about 750 cm, about 15 microns to about 500 microns, about 20 microns to about 250 microns, or about 50 microns to about 100 microns.

Figure 2A:
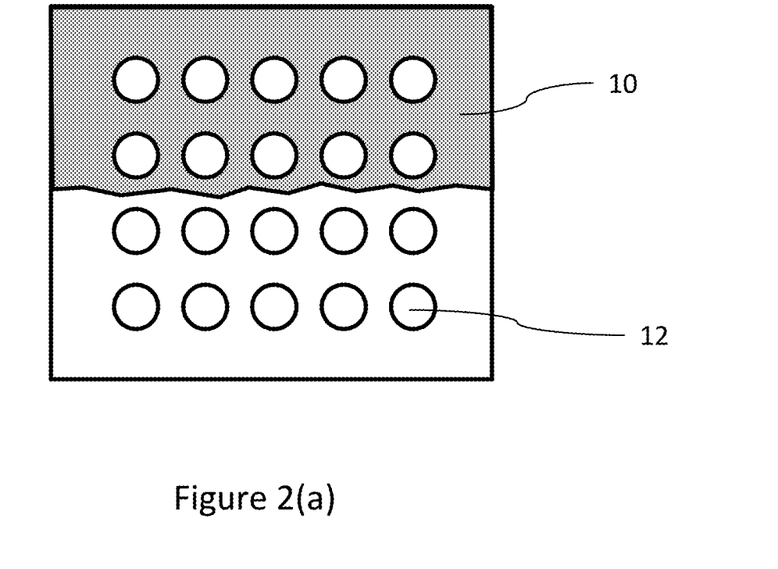
FIG. 2(a) depicts a view along an axis parallel to the fibers.
Figure 2B:
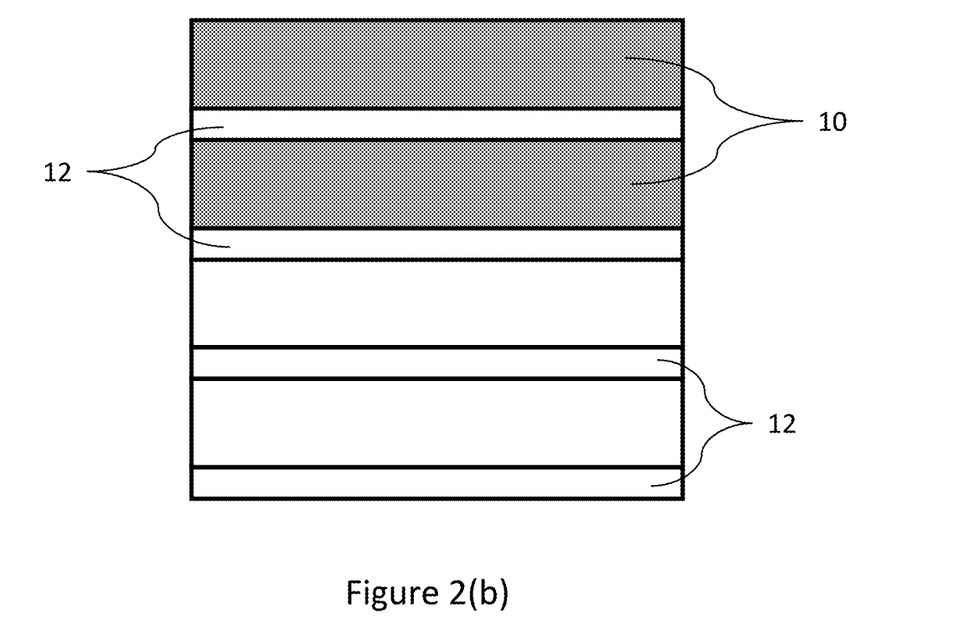
FIG. 2(b) depicts a view along an axis perpendicular to the fibers.

In at least one embodiment, the pores of the second material are completely infiltrated by the first material, producing an infiltration zone extending for at least substantially the entire thickness of the second material. The portion of the second material infiltrated by the first material may be at least about 1% by volume—e.g., at least about 2%, about 5%, about 10%, about 25%, about 50%, about 75%, about 90%, about 99% or about 100% by volume. In at least one embodiment, the portion of the second material infiltrated by the first material may be in the range of about 1 to about 100% by volume—e.g., about 2 to about 95%, about 5 to about 85%, about 10 to about 75%, or about 25 to about 50% by volume. FIGS. 2(a)-2(b) depict a structure in which the first material 10 has at least partially infiltrated the second material 12. FIG. 2(a) depicts a view along an axis parallel to the fibers, and FIG. 2(b) depicts a view along an axis perpendicular to the fibers.

The first material containing an amorphous alloy may form a coating on the second material containing a fiber material. In one embodiment, the second material may be encapsulated by the coating of the first material. In another embodiment, only a portion (e.g., surface) of the second material is covered by the first material. Encapsulation in one embodiment refers to a composition where the first material prevents the exposure of the second material to the environment that is in contact with the surface of the first material furthest from the second material. The coating layer of the first material may be continuous or discontinuous along the length of the second material. In another embodiment, the coating layer covers at least one surface of the second material.

Figure 4A:
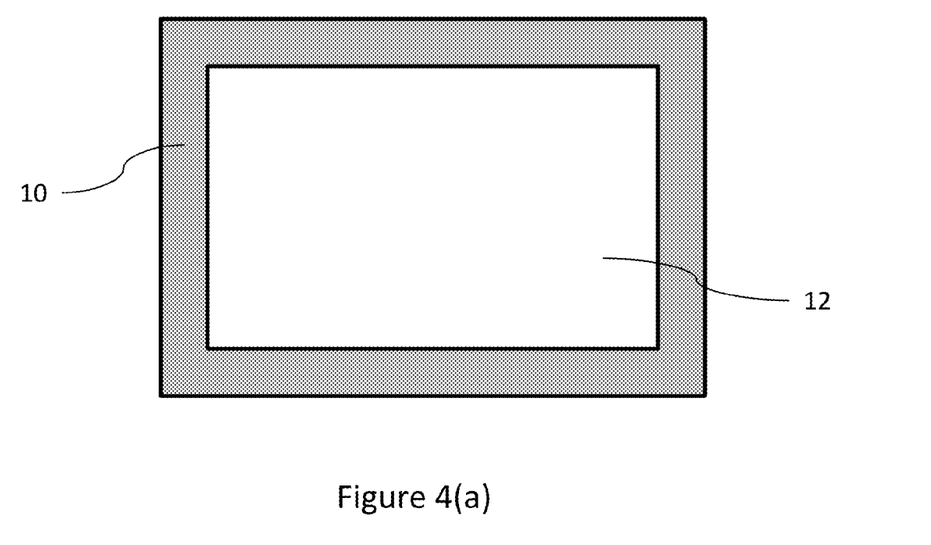
FIGS. 4(a)-4(b) are schematic drawings of a composition according to at least one exemplary embodiment, wherein a second material is encapsulated by a first material.
Figure 4B:
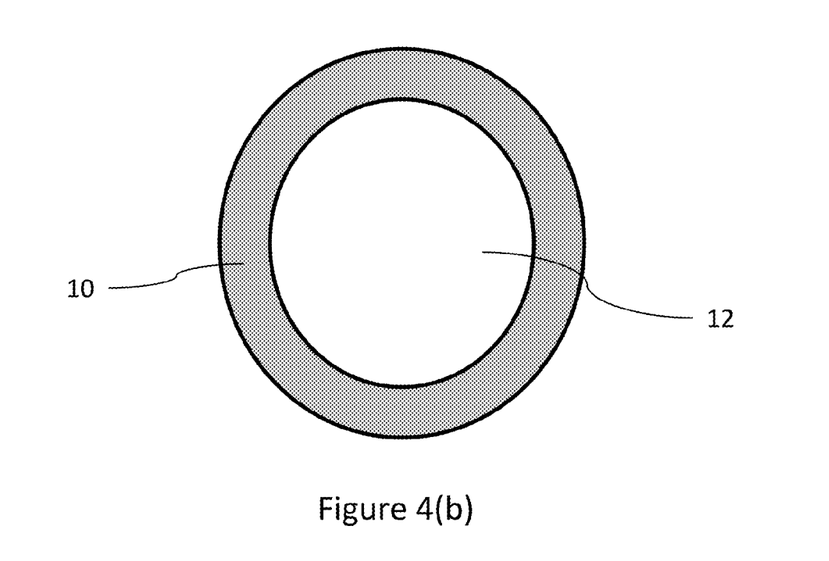

The coating layer of the first material may have a thickness of at least about 5 microns—e.g., at least about 10 microns, about 15 microns, about 25 microns, about 50 microns, about 100 microns, about 500 microns, about 1 mm, about 5 mm, about 10 mm or more. The coating layer comprising the first material has a thickness in the range of about 5 microns to about 10 mm—e.g., about 10 microns to about 5 mm, about 25 microns to about 1 mm, or about 50 to about 500 microns in at least one embodiment. The coating layer of the first material may constitute at least about 1% by volume of the composition, e.g., at least about 2%, about 5%, about 10%, about 25%, about 50%, about 75% or more, by volume. FIGS. 4(a)-(b) depict two embodiments in which a coating of the first material 10 is formed on a surface of the second material 12. As can be seen in FIGS. 4(a)-(b), the composite (with a coating) can take on different shapes.

The coating thickness may vary with respect to the "substrate" layer over which the coating is disposed. For example, the coating may have a larger, smaller, or the same thickness as the substrate layer. In one embodiment, the coating has a thickness that is smaller than that of the substrate layer. For example, the coating thickness may be less than about 20% of that of the substrate layer—e.g., less than about 10%, about 5%, about 2%, about 1%, or less.

Figure 3A:
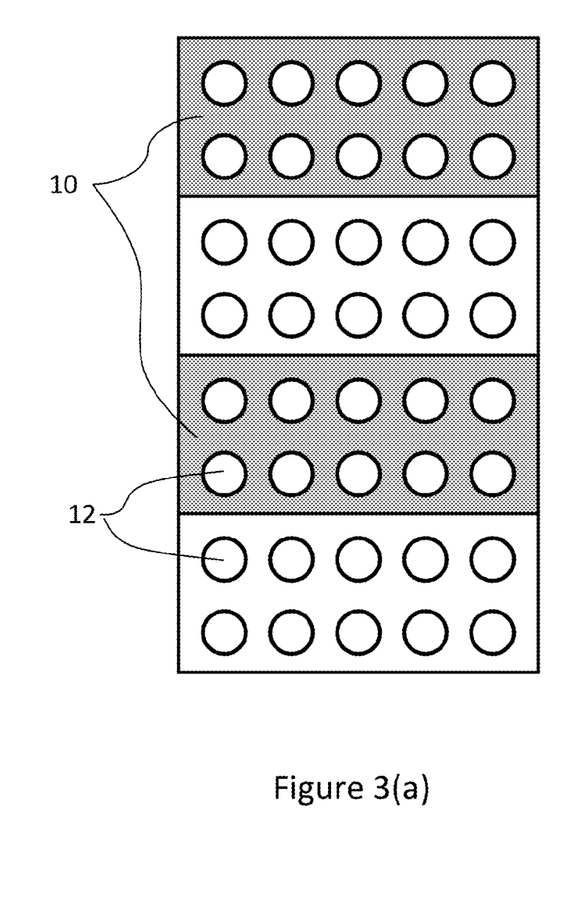
FIG. 3(a) depicts a view along an axis parallel to the fibers.
Figure 3B:
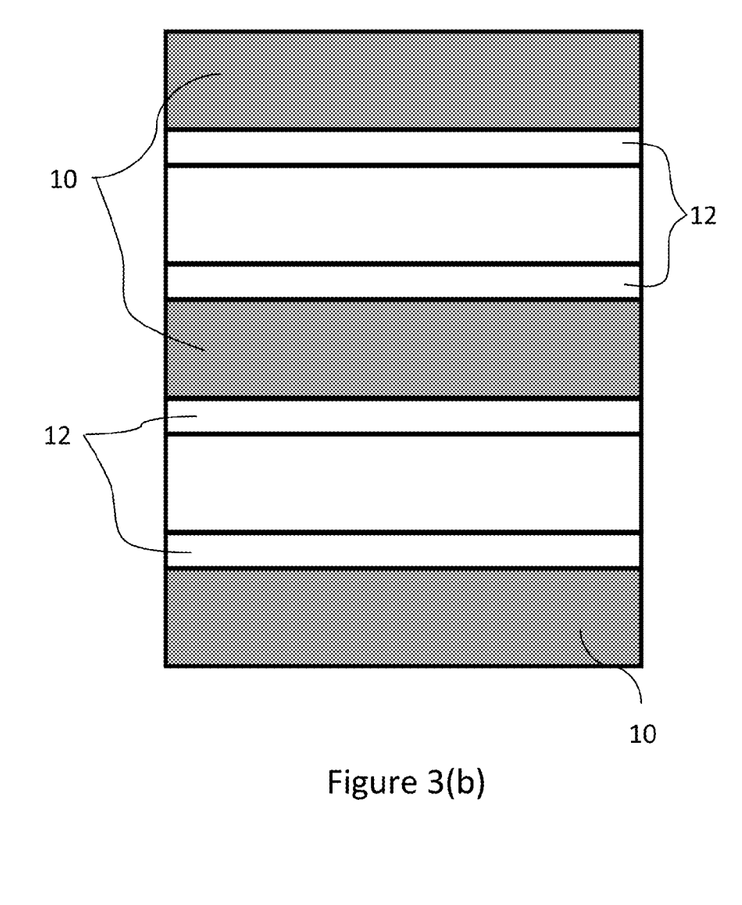
FIG. 3(b) depicts a view along an axis perpendicular to the fibers.

The composition may comprise a plurality of layers, at least one of which may be a first layer that comprises a first amorphous alloy-containing material that is disposed over at least a second layer comprising the second fiber-containing material. At least a portion of the first layer is in contact with the second layer in at least one embodiment. In another embodiment, at least a portion of the first layer is mechanically bonded to the second layer. In at least one embodiment, the composition includes more than one layer comprising the second material. In another embodiment, the composition includes more than one layer comprising the first material. FIGS. 3(a)-(b) depict an embodiment including a plurality of layers of both the first material 10 and the second material 12. FIG. 3(a) depicts a view along an axis parallel to the fibers, and FIG. 3(b) depicts a view along an axis perpendicular to the fibers.

At least some of the layers may have a thickness of at least about 10 microns—e.g., at least about 15 microns, about 25 microns, about 50 microns, about 100 microns, about 500 microns, about 1 mm, about 5 mm or about 10 mm. The layers may have a thickness in the range of about 10 microns to about 10 mm—e.g., about 15 microns to about 5 mm, about 25 microns to about 1 mm, or about 50 to about 500 microns in at least one embodiment. In one embodiment, the first layer may have a first thickness and the second layer may have a second thickness, and the first thickness is less than about 50% of the second thickness—e.g., less than about 40%, about 30%, about 20%, about 10%, or less. The first thickness may be in the range of about 5% to about 75% of the second thickness—e.g., about 10% to about 60%, about 20% to about 50%, or about 30% to about 40%.

In another embodiment, the composition may include a third material comprising a second amorphous alloy, which is different from the first amorphous alloy. Alternatively, the second amorphous alloy may be the same as the first amorphous alloy.

The amorphous alloy described herein generally may be inert and thus does not interact with the fiber material. Interaction herein may refer to chemical interaction, such as chemical inter-diffusion. Thus, in the case where the fiber contains carbon, the composition may be free of carbon-containing compound, such as carbide.

In one embodiment, the composition comprises carbide in an amount of less than about 10% by volume—e.g., less than about 5%, about 3%, about 2%, 1% or 0.5% by volume. In one embodiment the composition is substantially free of carbide, for example, at the interface region between the amorphous alloy containing material and the carbon fiber containing material. Similarly, in the case that the fiber contains boron, nitrogen, etc., the composition may be substantially free of boride, or nitride, respectively.

The composition may further comprise reinforcing fibers, particles, or combinations thereof in addition to the fibers of the second material. The reinforcing fibers may be silicon carbide fibers, glass fibers, boron fibers, or combinations thereof. Depending on the application, other materials may also be used.

The composition described herein may have a tensile strength of greater than about 3.0 GPa—e.g., greater than about 4.0 GPa, about 4.5 GPa, about 5.0 GPa, about 5.5 GPa, about 6.0 GPa, about 6.5 GPa or about 7.0 GPa or more. In at least one embodiment the tensile strength is in the range of about 3 to about 11 GPa—e.g., about 4 to about 10 GPa, about 4.5 to about 9 GPa, about 5.0 to about 8.5 GPa, about 5.5 to about 8.0 GPa, about 6.0 to about 7.5 GPa, or about 6.5 to about 7 GPa. In one embodiment, the composition may have a tensile strength that is greater than the tensile strength of an amorphous alloy contained in the material.

The composition described herein may have a tensile stiffness of greater than about 50 GPa—e.g., greater than about 100 GPa, about 150 GPa, about 200 GPa, about 250 GPa, about 300 GPa, about 350 GPa, about 400 GPa, about 450 GPa, or more. In at least one embodiment the tensile stiffness is in the range of about 100 to about 500 GPa—e.g., about 150 to about 450 GPa, about 200 to about 400 GPa or about 250 to about 350 GPa. In one embodiment, the composition may have a tensile stiffness that is greater than the tensile stiffness of an amorphous alloy contained in the material.

The composition described herein may have a density of less than about 3.0 g/cc—e.g., less than about 2.8 g/cc, about 2.6 g/cc, about 2.4 g/cc, about 2.2 g/cc, about 2.0 g/cc, about 1.8 g/cc, about 1.5 g/cc or less. In at least one embodiment the composition has a density in the range of about 1.8 to about 3.0 g/cc—e.g., about 2.0 to about 2.8 g/cc or about 2.2 to about 2.6 g/cc. In one embodiment, the composition may have a density that is less than the density of an amorphous alloy contained in the material.

The composition described herein may have a Vickers hardness of about 400 to about 700 Hv—e.g., about 450 to about 650 Hv or about 500 to about 600 Hv. In at least one embodiment the composition has a Vickers hardness of about 500 Hv. The composition exhibits in at least one embodiment a Vickers hardness of at least about 400 Hv—e.g., at least about 425 Hv, about 450 Hv, about 475 Hv, about 500 Hv, about 525 Hv, or more.

The compositions described herein may be resistant to wear and/or corrosion. The corrosion may refer to chemical corrosion, stress corrosion, or both.

The compositions described herein may comprise any amount of the fiber materials, depending on the application. For example, a composition may comprise about 1% to about 99% by volume of carbon fiber—e.g., about 50% to about 99%, about 5% to about 95%, about 10% to about 90%, about 20% to about 80%, about 25% to about 75%, about 30% to about 70% or about 40% to about 60%. In at least one embodiment, the composition comprises greater than about 1% by volume of fiber—e.g., greater than about 2%, about 5%, about 10%, about 15%, about 20%, about 25%, about 30%, about 40%, about 50%, about 60%, about 70%, about 75%, about 80%, about 90%, about 95%, or more of fiber. In at least one embodiment the composition comprises less than about 99% of fiber—e.g., less than about 98%, about 95%, about 90%, about 80%, about 75%, about 60%, about 50%, about 40%, about 30%, about 25%, about 15%, about 10%, about 5%, or less of fiber. The volume fraction of the fiber material in the composition may affect the mechanical properties of the material, such as tensile strength, tensile stiffness, and density. Depending on the application, the volume percentage of the component containing the fiber may be the same, greater than, or smaller than that of the component containing the amorphous alloy.

The composition may comprise a woven material comprising at least a first fiber comprising a first material and a second fiber comprising a second material, wherein the first fiber material comprises an amorphous alloy and the second material comprises a carbon fiber. The woven material may further comprise a third fiber comprising a third material. In one embodiment, the third material comprises a silicon carbide fiber, glass fiber, boron fiber or combinations thereof.

In one embodiment, the composition may further comprise a third material in contact with at least a portion of the composition comprising a woven material. The third material may be the same as or different from the first material and the second material. In at least one embodiment, the third material comprises an amorphous alloy. In some embodiments, the first material is disposed over at least a portion of the second material and/or a portion of the second material. For example, the composition may comprise the first and the third material sandwiching the second material in the middle. Alternatively, the composition may comprise the first material disposed over the second and the third material, with the second and third material being in contact with each other side to side.

Method of Producing a Fiber-Containing Composite

Provided in some embodiments herein are methods of producing any of the compositions described above.

Figure 1:
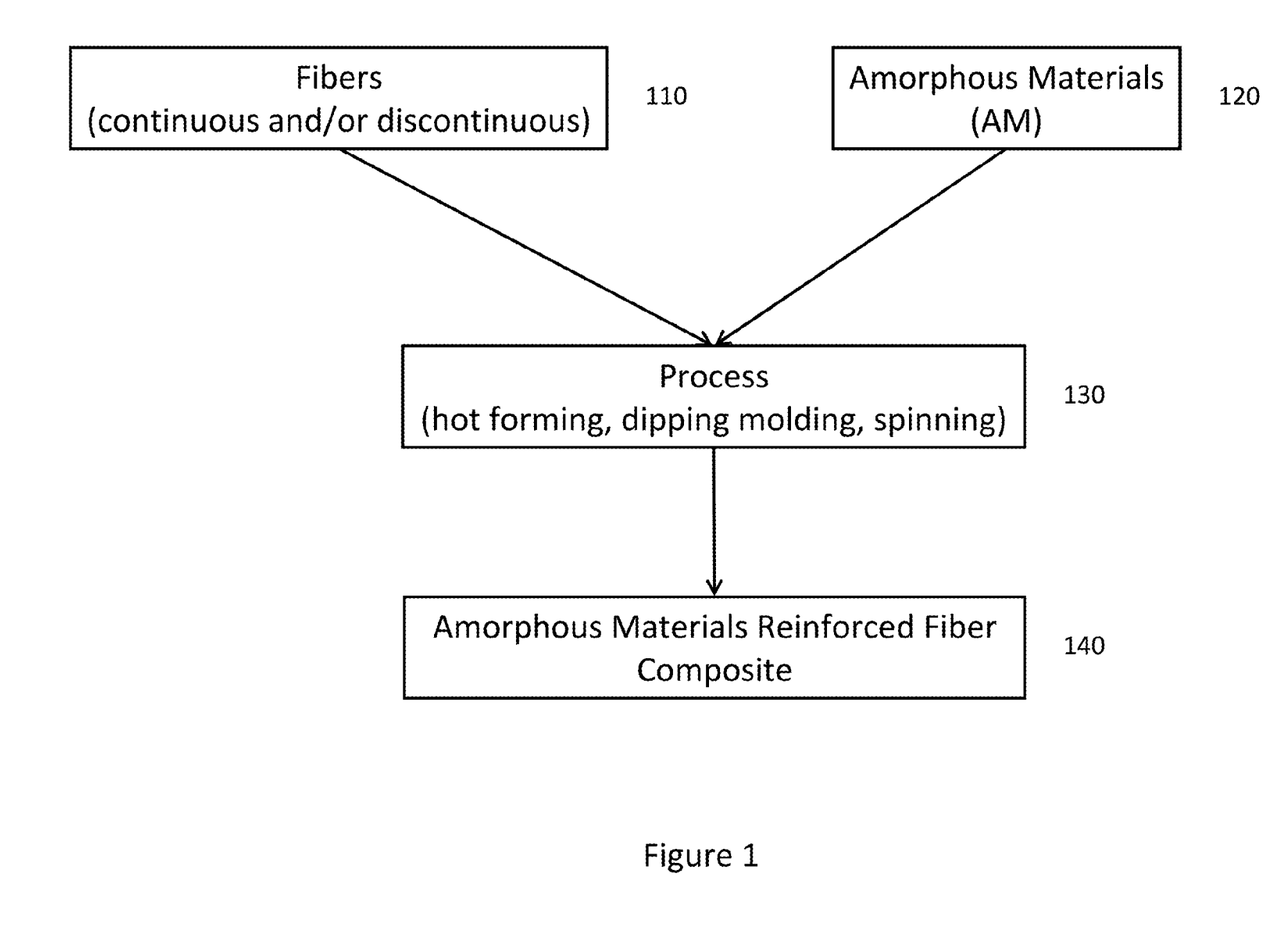
FIG. 1 is a flow chart that depicts a method of fabricating a composition according to at least one exemplary embodiment.

The following description applies to at least some embodiments of the method of producing a composition described herein. FIG. 1 provides a schematic flowchart showing the at least some processes that may be involved in one embodiment.

One embodiment provides a method for producing a composition, the method comprising: heating a first material comprising an amorphous alloy to a first temperature, and contacting the first material with a second material comprising at least one fiber to form a composition comprising the first material and the second material. In one embodiment, the first temperature is higher than or equal to a glass transition temperature ($T_g$) of the amorphous alloy. The first material may be preheated and thus no separate heating step may be needed before bringing the first and second materials into contact.

The heating may be accomplished by or involve induction heating, or by heating the first material in a furnace, oven, or cartridge heater. The furnace, oven, and cartridge heater may be electrically powered, or powered by other known methods. The furnace, oven, and cartridge heater may be any of those commercially available.

The second fiber-containing material may be heated during the heating step. Alternatively, the second fiber-containing material may be preheated before the heating step. To facilitate the heating of the second material, the first material may be placed in contact with the second material prior to or during the heating process.

Another embodiment provides a method for producing a composition, the method comprising: contacting a first material comprising an amorphous alloy at a first temperature with a second material comprising at least one fiber to form a composition comprising the first material and the second material. In one embodiment the first temperature is higher than or equal to the $T_g$ of the amorphous alloy. As depicted in FIG. 1, one embodiment of the method includes processing 130 a first material comprising an amorphous alloy 120 and a second material comprising at least one fiber 110 together to form an amorphous alloy and fiber-containing composite material 140.

The first material may comprise any of the amorphous alloys described herein. In an exemplary embodiment, the first material consists essentially of the amorphous alloy. In another embodiment, the first material consists of the amorphous alloy. In at least one embodiment, the first material comprises a bulk amorphous alloy. In another embodiment, the amorphous alloy is not a bulk amorphous alloy.

The process may further comprise producing the first material comprising an amorphous alloy. For example, the amorphous alloy in one embodiment may be produced by melting precursor materials, mixing precursor materials to form a molten alloy of the desired composition, and cooling the molten mixture at a rate sufficient to produce at least some amorphous alloy.

The second material may comprise any of the fiber materials described herein. In an exemplary embodiment, the second material comprises at least one amorphous alloy fiber. In another embodiment, the fiber material comprises carbon, boron, silicon, oxygen, or combinations thereof. In at least one embodiment, the second material comprises a woven material comprising at least a first fiber comprising a first material and a second fiber comprising a second material. In one embodiment, the first material comprises an amorphous alloy and/or the second material comprises carbon fiber.

The first temperature may depend on the amorphous alloy contained in the first material. The composition of the amorphous alloy may affect the $T_g$, crystallization temperature ($T_x$), and the melting temperature ($T_m$). The $T_g$ may be lower than $T_x$, and $T_x$ may be lower than $T_m$ in at least one embodiment.

In one embodiment the first temperature is higher than or equal to the $T_g$ of the amorphous alloy. This embodiment includes temperatures in the range of about 100 to about 1500° C.—e.g., about 100 to about 1000° C., about 100 to about 900° C., about 100 to about 800° C., or about 100 to about 700° C. In at least one embodiment the first temperature is at least about 100° C.—e.g., at least about 150° C., about 200° C., about 250° C., about 300° C., about 350° C., about 400° C., about 450° C., about 500° C., about 550° C., about 600° C., about 650° C., about 700° C., or higher. In at least one embodiment, the first temperature is higher than the $T_g$ of the amorphous alloy. For example, the first temperature in at least one embodiment is at least about 0.5° C. higher than the $T_g$ of the amorphous alloy—e.g., at least about 1° C., 2° C., about 3° C., about 4° C., about 5° C., about 10° C., about 15° C., about 20° C., or higher, than $T_g$.

The $T_g$ of the amorphous alloy may be in the range of about 100° C. for gold based amorphous alloys, up to about 700° C. for iron or refractory based amorphous alloys. For zirconium and titanium based amorphous alloy systems the $T_g$ may be in the range of about 300 to about 450° C. Depending on the composition of the amorphous alloy, $T_g$ may vary.

In one embodiment, the first temperature is higher than or equal to $T_g$, and lower than the degradation temperature of the fiber contained in the second material. The degradation temperature of the fiber may be the temperature at which the fiber begins to react (e.g., chemically react) with the first material, or in one embodiment may be the melting temperature of the fiber.

In another embodiment, the first temperature is higher than or equal to $T_g$, and lower than $T_x$. This embodiment provides at least one advantage of minimizing formation of a crystalline material while allowing the amorphous metal to flow in a viscous manner.

The $T_x$ of the amorphous alloy may be in the range of about 120° C. for gold based amorphous alloys, up to about 750 or 800° C. for iron or refractory based amorphous alloys. For zirconium and titanium based amorphous alloy systems the $T_x$ may be in the range of about 350 to about 500° C. Depending on the composition of the amorphous alloy, $T_x$ may vary.

In one embodiment the first temperature is higher than or equal to $T_x$, and lower than $T_m$. In this embodiment it is important to cool the amorphous metal at a rate sufficient to form an alloy that is at least partially amorphous. For example, the rate may be at or greater than the critical cooling rate of the amorphous alloy. In one embodiment, the cooling rate is sufficient to produce an alloy consisting at least essentially of an amorphous alloy. The cooling rate may be achieved by employing compressed gas or air blowing, a water bath, a liquid solution bath, a heat sink, a chilling device, or combinations thereof. Active cooling processes may not be needed if a bulk solidifying amorphous alloy is utilized in this embodiment. The first temperature in at least one embodiment is at least about 1° C. higher than $T_x$—e.g., at least about 5° C., about 10° C., about 15° C., about 20° C., about 25° C., about 30° C., about 35° C., or higher.

The $T_m$ of the amorphous alloy may be in the range of about 200° C. for gold based amorphous alloys, up to about 1500° C. for iron or refractory based amorphous alloys. For zirconium and titanium based amorphous alloy systems the $T_m$ may be in the range of about 650 to about 900° C. Depending on the composition, $T_m$ may vary.

In one embodiment the first temperature is higher than or equal to $T_m$. In this embodiment it is important to cool the amorphous metal at a rate sufficient to form an alloy that is at least partially amorphous. In one embodiment, the process is sufficiently fast to avoid crystallization. Such a phenomenon may be captured by having a cooling rate sufficiently fast to bypass the crystallization curve of a time-temperature transformation (TTT) diagram of the alloy. In one embodiment, the cooling rate is sufficient to produce an alloy consisting at least essentially of an amorphous alloy. The cooling rate may be achieved by employing compressed gas or air blowing, a water bath, a liquid solution bath, a heat sink or a chilling device. Active cooling processes may not be needed if a bulk solidifying amorphous alloy is utilized in this embodiment. The first temperature in at least one embodiment is at least about 1° C. higher than $T_m$—e.g., at least about 5° C., about 10° C., about 15° C., about 20° C., about 25° C., about 30° C., about 35° C., or higher.

The contacting step as described above may involve bringing the first material into contact with the second material, or vice versa. For example, the contacting may involve immersing at least a portion of the second fiber-containing material in the first amorphous alloy containing material, such that at least some of the first material is disposed over the surface of the second material. Immersing may involve submerging a portion of the second material below the surface of the first material. This type of contacting may produce at least a partial coating of the first material on the second material, and may be referred to as a "dip coating" process (or a "fondue coating" process). In one embodiment of this process, an additional step of removing the second material from the first material may be performed after the immersion, such that after the removal at least some of the first material is disposed over the surface of the second material.

In another embodiment, the contacting step involves immersing at least a portion of the second material in the first material and removing the second material from the first material, wherein after removal at least some of the first material is disposed over the surface of the second material. Immersing constitutes submerging a portion of the second material below the surface of the first material. This type of contacting produces at least a partial coating of the first material on the second material, and may be referred to as a "dip coating" process or a "fondue coating" process.

In another embodiment the contacting involves disposing at least a first layer over at least a second layer, wherein the first layer comprises the first material and the second layer comprises a second material. The contacting may result in the formation of a layered structure comprising a mechanical bond between at least a portion of the layers in at least one embodiment. In one embodiment, the bond formed between the portions of the layers is at least substantially free of a chemical bond (e.g. formed as a result of chemical interaction). In one embodiment, a third layer comprising a third material may be additionally included in the layered structure in at least one embodiment, and the third material may have a composition that is the same as or different from the first two materials. In at least one embodiment, the third layer may be in contact with at least one layer (such as both the first layer and the second layer). In another embodiment, the third layer may be separated from the first layer by at least the second layer. A plurality of layers comprising the first material may be included in one embodiment. In at least one embodiment, a plurality of layers comprising the second material may be present. The layered structure produced by this process may be referred to as a "laminated" structure or a "sandwich" structure.

In another embodiment, the contacting involves applying a pressure to the first material. The pressure may be applied as part of a hot press or injection molding process. In one embodiment, the pressure may help distribution of the first material and to facilitate bonding between the first and second material. The hot press process involves the application of pressure utilizing a mechanical press in at least one embodiment, and may be especially useful when a layered structure is employed. Gas pressure may be employed to apply a pressure to the first material in at least one embodiment. The pressure may induce a viscous flow of the first material and allow the formation of a mechanical bond between at least a portion of the first and second material. The injection molding process may involve the application of a pressure, wherein the pressure may induce a viscous flow of at least the first material into a mold. Depending on the technique and material involved, the pressure applied may vary. In one embodiment, the pressure applied is in the range of about 500 ksi—e.g., about 450 to about 550 ksi, about 400 to about 600 ksi, about 350 to about 650 ksi, or about 300 to about 700 ksi. In another embodiment the pressure applied is at least about 300 ksi—e.g., at least about 350 ksi, about 400 ksi, about 450 ksi, about 500 ksi, about 550 ksi, about 600 ksi, about 650 ksi, about 700 ksi, or more.

The contacting may involve a melt spinning process, a melt infiltration process, or both. A melt spinning process may involve spinning at least the first material to form small size regime articles, which may be rapidly cooled. For example, the melt-spun articles may have a minimum dimension in the range of about 1 micron to about 100 microns—e.g., about 5 microns to about 90 microns, about 10 microns to about 75 microns, or about 20 microns to about 50 microns. In one embodiment, the melt-spun articles may have a minimum dimension of less than about 100 microns—e.g., less than about 75 microns, about 50 microns, about 25 microns, about 20 microns, about 10 microns, about 5 microns, about 1 micron, or less. A melt infiltration process may involve disposing the first material on the second material in a manner that will allow the first material to infiltrate the at least a portion (e.g. pores) of the second material at temperatures above the $T_m$ of the amorphous alloy. In another embodiment, the contacting may involve a melt spinning process, a melt infiltration process, or a combination thereof that includes very rapid cooling sufficient to result in the formation of at least some amorphous alloy.

The heating and/or contacting may be conducted in air, an ambient atmosphere, a controlled gas atmosphere, an inert gas atmosphere, a pressurized atmosphere, or a vacuum. In at least one embodiment, the heating and/or contacting may be conducted under an argon or nitrogen atmosphere.

In some embodiments, chemical reactions between the first and second materials are minimized. Chemical reactions between the first and second materials may result in the production of carbides, which negatively affect the properties of the composition. Not to be bound by any theory, but carbides in the composition may undesirably increase the brittleness of the material. Thus, one approach to minimize the degree of chemical reaction between the first and second materials may be to utilize a lower first temperature. In at least one embodiment, the contacting involves substantially no chemical interaction between the first and second material.

In another embodiment, the first temperature is maintained for the minimum amount of time needed for the contacting of the first and second material to occur. Longer times may also be employed. In at least one embodiment, minimizing the time in which the first and second materials are at or above the first temperature may prevent chemical reactions between the first and second materials. Further, such an approach may further prevent the degradation of the fibers contained in the second material. The first temperature may be maintained for a time that will ensure no (or substantially no) crystalline materials are formed in the amorphous alloy material. For example, the first temperature may be maintained for a time that will not intersect with the crystallization curve on the relevant Time-Temperature Transformation diagram.

In another embodiment, at least a portion of the fibers contained in the second material may be coated prior to the contacting step to minimize the reaction of the fibers with the amorphous alloy. The entire circumferential and/or proximal surfaces or a portion thereof, may be coated. The coating may comprise titanium nitride, silicon nitride, or combinations thereof in at least one embodiment.

Another embodiment provides a method of producing a composition by weaving together at least a first fiber comprising a first material and a second fiber comprising a second material to form a woven material. The first material may comprise an amorphous alloy and the second material may comprise carbon fiber. A third fiber comprising a third material may be additionally woven with the first fiber and/or second fiber to form a woven material comprising at least a first fiber, second fiber, and third fiber. In one embodiment, the third material comprises a silicon carbide fiber, glass fiber, boron fiber, or combination thereof.

In one embodiment, the method of producing a composition by weaving may further comprise disposing a third material over at least a portion of the woven composition. The third material may be the same as or different from the first material and the second material. In at least one embodiment, the third material comprises an amorphous alloy.

The composition produced by the process described herein may be further subjected to post-process finishing. In at least one embodiment, the composition is subjected to a finishing process selected from at least one of grinding, polishing, machining, trimming, cutting, painting and coating.

At least in view of the foregoing, the composite compositions described herein may be used to improve a property of a material. In one embodiment, a method for improving a property of a fiber-containing composition is provided. The method comprises contacting a first material comprising an amorphous alloy at a first temperature with a second material comprising a fiber-containing composition to form a composition comprising the first material and the second material. The first temperature may be equal to or higher than the $T_g$ of the amorphous alloy. The composition comprising the first and second materials has at least one improved property in comparison to a second composition that is substantially free of amorphous alloy.

The property herein may refer to corrosion resistance, wear resistance, tensile strength, tensile stiffness, Vickers hardness, toughness, strength to weight ratio, density, or any combination thereof.

A property is considered to be improved when in comparison to another material the property is more desirable for any given application. For example, in the case of tensile strength, improvement may refer to an increase in magnitude.

The various improved properties of the composite compositions described herein make them appealing for various applications. For example, the compositions described herein may be a part of an aerospace component, automobile, boat, ship, medical device, industrial equipment, sporting equipment, eyewear or electronic device. An aerospace component may refer to any part that moves through air or space. For example, an aerospace component may be part of an airplane or spacecraft. In one embodiment, the composition is a part of an airplane wing, fuselage, or both.

Additional Embodiments

The following additional embodiments are taken from the claims of U.S. Provisional Patent Application Ser. No. 61/675,084, to which the present application claims priority.

1. A method for producing a composition, comprising: heating a first material comprising an amorphous alloy to a first temperature, and contacting the first material with a second material comprising at least one fiber to form a composition comprising the first material and the second material, wherein the first temperature is higher than or equal to a glass transition temperature ($T_g$) of the amorphous alloy.

2. The method of embodiment 1, wherein the first temperature is less than the crystallization temperature ($T_x$) of the amorphous alloy.

3. The method of embodiment 1, herein the first temperature is greater than $T_x$ and below a melting temperature ($T_m$) of the amorphous alloy.

4. The method of embodiment 1, wherein the first temperature is greater than $T_x$ and below $T_m$ of the amorphous alloy, and the method further comprises: cooling the first material at a first cooling rate sufficient to form at least some of the amorphous alloy in the first material, wherein the cooling involves gas blowing, a water bath, a liquid solution bath, a heat sink, a chilling device, or combinations thereof.

5. The method of embodiment 1, wherein the first temperature is at least about 100° C.

6. The method of embodiment 1, wherein the contacting further comprises applying a pressure to the first material.

7. The method of embodiment 1, wherein the contacting involves at least a hot press forming process, an injection molding process, or a combination thereof, of the first material and the second material.

8. The method of embodiment 1, wherein the first temperature is lower than a melting temperature of the second material.

9. The method of embodiment 1, wherein the contacting is carried out in air, an ambient atmosphere, a controlled gas atmosphere, an inert gas atmosphere, a pressurized atmosphere, or a vacuum.

10. The method of embodiment 1, wherein the contacting results in substantially no chemical interaction between the first material and the second material.

11. The method of embodiment 1, wherein the heating involves induction heating, heating in a furnace, heating in an oven, heating with a cartridge heater, or combinations thereof.

12. The method of embodiment 1, further comprising heating the second material.

13. The method of embodiment 1, wherein the first material comprises a bulk amorphous alloy.

14. The method of embodiment 1, wherein the first material comprises zirconium, titanium, iron, copper, nickel, gold, platinum, palladium, aluminum, or combinations thereof.

15. The method of embodiment 1, wherein the first material consists essentially of the amorphous alloy.

16. The method of embodiment 1, wherein the first material comprises an alloy of the composition $(Zr, Ti)_a(Ni, Cu, Fe)_b(Be, Al, Si, B)_c$, wherein a, b, and c are each a number independently representing an atomic percentage, and a is about 30-75, b is about 5-60, and c is about 0-50.

17. The method of embodiment 1, wherein the first material further comprises a crystalline material.

18. The method of embodiment 1, wherein the at least one fiber comprises element carbon, silicon, boron, oxygen, or combinations thereof.

19. The method of embodiment 1, wherein the second material comprises a resin-carbon fiber composite.

20. The method of embodiment 1, wherein at least a portion of the second material comprises a weave, bundle, mat, or individual strand of a plurality of the at least one fiber.

21. The method of embodiment 1, wherein the at least one fiber is coated with silicon carbide, titanium nitride, or a combination thereof.

22. The method of embodiment 1, wherein the second material comprises at least one fiber of an amorphous alloy.

23. The method of embodiment 1, further comprising producing the first material comprising an amorphous alloy.

24. A composition produced by the method according to embodiment 1.

25. A method for producing a composition, comprising: contacting a first material comprising an amorphous alloy at a first temperature with a second material comprising at least one fiber to form a composition comprising the first material and the second material, wherein the first temperature is higher than or equal to the glass transition temperature ($T_g$) of the amorphous alloy.

26. The method of embodiment 25, wherein the first temperature is greater than or equal to $T_m$ of the amorphous alloy, and the method further comprises cooling the first material at a first cooling rate sufficient to form the amorphous alloy of the first material.

27. The method of embodiment 26, wherein the cooling involves gas blowing, a water bath, a liquid solution bath, a heat sink, a chilling device, or combinations thereof.

28. The method of embodiment 25, wherein the contacting involves at least one of a dip coating process, a melt spinning process, and a melt infiltration process.

29. The method of embodiment 25, wherein the contacting involves applying a pressure to the first material.

30. The method of embodiment 25, wherein the contacting further comprises immersing a portion of the second material into the first material, such that at least some of the first material is disposed over the portion of the second material.

31. The method of embodiment 25, wherein the contacting further comprises: immersing a portion of the second material into the first material, and removing the portion from the first material, such that at least some of the first material is disposed over a surface of the portion of the second material.

32. The method of embodiment 25, wherein the contacting further comprises: disposing a first layer comprising the first material over a second layer comprising the second material to form a layered structure comprising the composition, and applying a pressure to the layered structure such that a mechanical bond is formed between a first portion of the first layer and a second portion of the second layer.

33. The method of embodiment 25, wherein the contacting further comprises: disposing a first layer comprising a first material over a second layer comprising a second material and a third layer comprising a third material to form a layered structure comprising the composition, and applying a pressure to the layered structure such that a mechanical bond is formed between a first portion of the first layer and at least one of a second portion of the second layer and a third portion of the third layer, wherein the third material has a chemical composition that is the same as or different from at least one of the first and second materials.

34. The method of embodiment 25, wherein the first material consists essentially of the amorphous alloy.

35. The method of embodiment 25, wherein the first material comprises zirconium, titanium, iron, copper, nickel, gold, platinum, palladium, aluminum, or combinations thereof.

36. The method of embodiment 25, wherein the at least one fiber comprises element carbon, boron, silicon, oxygen, or combinations thereof.

37. A composition comprising a first material disposed over a second material, wherein at least a portion of the first material is in contact with the second material, the first material comprises a first amorphous alloy, and the second material comprises at least one fiber.

38. The composition of embodiment 37, wherein the first material further comprises a crystalline material.

39. The composition of embodiment 37, wherein the at least one fiber comprises the element carbon, silicon, boron, oxygen, or combinations thereof.

40. The composition of embodiment 37, wherein the at least one fiber comprises silicon carbide, glass, boron, or combinations thereof.

41. The composition of embodiment 37, wherein the second material comprises a woven material comprising at least a first fiber comprising an amorphous alloy and a second fiber comprising carbon fiber.

42. The composition of embodiment 37, wherein the composition comprises a first layer of the first material, and the first layer has a thickness of at least 10 microns.

43. The composition of embodiment 37, wherein the second material comprises pores and at least some of the pores are infiltrated by the first material.

44. The composition of embodiment 37, wherein the composition comprises a first layer comprising the first material and encapsulating the second material.

45. The composition of embodiment 37, wherein the second layer is disposed over a third layer, wherein the third layer comprises a second amorphous alloy that is the same as or different from the first amorphous alloy.

46. The composition of embodiment 37, wherein the composition comprises a plurality of layers, at least some of which comprise the first material.

47. The composition of embodiment 37, wherein the composition comprises a plurality of layers, at least some of which comprise the second material.

48. The composition of embodiment 37, wherein the composition has at least one property selected from a tensile strength of greater than about 4.5 GPa, a tensile stiffness of about 100-500 GPa, a density of about 1.8-3.0 g/cm$^3$, and a Vickers hardness of about 400-700 Hv.

49. The composition of embodiment 37, wherein the composition is resistant to corrosion.

50. The composition of embodiment 37, wherein the composition comprises about 50-99 vol. % of the second material.

51. The composition of embodiment 37, wherein the composition is substantially free of carbide.

52. The composition of embodiment 37, wherein the composition comprises less then about 3 vol. % carbide.

53. The composition of embodiment 37, wherein the first layer has a first thickness and the second layer has a second thickness, and wherein the first thickness is less than about 10% of the second thickness.

54. The composition of embodiment 37, wherein the composition further comprises reinforcement fibers, particles, or combinations thereof.

55. The composition of embodiment 37, wherein the composition is a part of an aerospace component, automobile, boat, ship, medical device, industrial equipment, sporting equipment, eyewear, or electronic device.

56. A method for improving a property of a fiber-containing composition, comprising: contacting a first material comprising an amorphous alloy at a first temperature with a second material comprising a fiber-containing composition to form a composition comprising the first material and the second material, wherein the first temperature is higher than or equal to a glass transition temperature ($T_g$) of the amorphous alloy, and the composition has at least one improved property in comparison to a second composition that is substantially free of the amorphous alloy.

57. The method of embodiment 56, wherein the second composition comprises a polymer resin and carbon fiber.

58. The method of embodiment 56, wherein the property is at least one of a tensile strength, a tensile stiffness, a density, a Vickers hardness, and corrosion resistance.

59. A composition comprising, a woven material comprising at least one first fiber comprising a first material and at least one second fiber comprising a second material, wherein the first material comprises an amorphous alloy, and the second material comprises element carbon, silicon, boron, oxygen, or combinations thereof.

60. The composition of embodiment 59, further comprising a third fiber comprising a third material, wherein the third material comprises silicon carbide, glass, boron, or combinations thereof.

61. The composition of embodiment 59, further comprising a third material in contact with the composition, wherein the third material is the same as or different from the first and second materials.

62. A method of producing a composition, the method comprising, weaving together at least one first fiber comprising a first material and at least one second fiber comprising a second material to form a woven material, wherein the first material comprises an amorphous alloy, and the second material comprises element carbon, silicon, boron, oxygen, or combinations thereof.

63. The method of embodiment 62, further comprising weaving at least a third fiber comprising a third material with at least one of the first fiber and the second fiber to form a woven material comprising at least the first fiber, second fiber, and third fiber, wherein the third fiber comprises silicon carbide, glass, boron or combinations thereof.

64. The method of embodiment 62, further comprising disposing a layer of a third material over at least a portion of the composition, wherein the third material is the same as or different from the first and second materials.

Conclusion

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." Any ranges cited herein are inclusive.

The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed:

1. A method of producing a composition, the method comprising, weaving together at least one first fiber comprising a first material and at least one second fiber comprising a second material to form a woven material, wherein the first material comprises an amorphous alloy, and the second material comprises element carbon, silicon, boron, oxygen, or combinations thereof, further comprising at least partially infiltrating the first material at a first temperature into at least a portion of the second material to form the composition, wherein the composition comprises the amorphous alloy and the second material, and wherein the first temperature is higher than or equal to the glass transition temperature ($T_g$) of the amorphous alloy.

2. The method of claim 1, wherein the first temperature is less than the crystallization temperature ($T_x$) of the amorphous alloy.

3. The method of claim 1, wherein the first temperature is greater than the crystallization temperature ($T_x$) of the amorphous alloy.

4. The method of claim 1, wherein the at least partially infiltrating further comprises applying a pressure to the first material.

5. The method of claim 1, wherein the first temperature is lower than a melting temperature of the second material.

6. The method of claim 1, wherein the at least partially infiltrating results in substantially no chemical interaction between the first material and the second material.

7. The method of claim 1, further comprising heating the first material to the first temperature.

8. The method of claim 1, wherein the first material comprises zirconium, titanium, iron, copper, nickel, gold, platinum, palladium, aluminum, or combinations thereof.

9. The method of claim 1, wherein the at least one first or second fiber comprises an amorphous alloy or the element carbon, silicon, boron, oxygen, or combinations thereof.

10. The method of claim 1, further comprising producing the first material comprising an amorphous alloy.

11. The method of claim 1, further comprising disposing a third material over at least a portion of the woven material.

12. The method of claim 11, wherein the third material is the same as or different from the first material and the second material.

13. The method of claim 11, wherein the third material comprises an amorphous alloy.

14. The method of claim 1, further comprising weaving at least a third fiber comprising a third material with at least one of the first fiber and the second fiber to form the woven material comprising at least the first fiber, second fiber, and third fiber.

15. The method of claim 14, wherein the third fiber comprises silicon carbide, glass, boron or combinations thereof.

16. The method of claim 1, further comprising disposing a layer of a third material over at least a portion of the composition, wherein the third material is the same as or different from the first and second materials.

* * * * *